United States Patent
Reiner et al.

(10) Patent No.: US 10,246,937 B2
(45) Date of Patent: Apr. 2, 2019

(54) BARREL BOLT FASTENER ASSEMBLY

(71) Applicant: Glide Rite Corporation, Woodland Hills, CA (US)

(72) Inventors: Andrew Eric Reiner, Woodland Hills, CA (US); Wen Hong Zeng, Foshan (CN)

(73) Assignee: Glide Rite Corporation, Woodland Hills, CA (US)

( * ) Notice: Subject to any disclaimer, the term of this patent is extended or adjusted under 35 U.S.C. 154(b) by 0 days.

(21) Appl. No.: 15/380,332

(22) Filed: Dec. 15, 2016

(65) Prior Publication Data

US 2018/0171700 A1 Jun. 21, 2018

(51) Int. Cl.
| | |
|---|---|
| E06B 9/06 | (2006.01) |
| F16B 33/00 | (2006.01) |
| F16B 5/02 | (2006.01) |
| F16B 5/06 | (2006.01) |
| F16B 37/14 | (2006.01) |
| F16B 43/00 | (2006.01) |

(52) U.S. Cl.
CPC .......... E06B 9/0661 (2013.01); E06B 9/0623 (2013.01); F16B 33/002 (2013.01); F16B 5/02 (2013.01); F16B 5/065 (2013.01); F16B 37/145 (2013.01); F16B 43/00 (2013.01)

(58) Field of Classification Search
CPC .......... E06B 9/0661; E06B 3/928; E06B 9/06; F16B 39/28
USPC ......... 160/136–165; 411/338, 370, 367, 197; 30/270
See application file for complete search history.

(56) References Cited

U.S. PATENT DOCUMENTS

| | | | | |
|---|---|---|---|---|
| 1,657,284 A | * | 1/1928 | Shonnard ................ | E06B 9/063 160/162 |
| 2,524,652 A | * | 10/1950 | Dalley .................... | B26B 13/28 30/270 |
| 2,662,242 A | * | 12/1953 | Hess ........................ | A47G 5/00 16/257 |

(Continued)

FOREIGN PATENT DOCUMENTS

GB 587508 A * 4/1947

OTHER PUBLICATIONS

Illinois Engineered Products "Project Showcase" 2015 <http://www.illinoisengineeredproducts.com/showcase_folding_gate.html> (Year: 2015).*

(Continued)

*Primary Examiner* — Katherine W Mitchell
*Assistant Examiner* — Johnnie A. Shablack

(57) ABSTRACT

An improved barrel bolt assembly and extensible gate comprising the same wherein the assembly includes a washer having at least one inward or outward projection annularly disposed about an internal periphery thereof, a fastener having a head portion and a shank portion extending therefrom, and a barrel having a head portion and a boss portion extending therefrom, wherein the boss portion is operative to receive the fastener shank portion and the barrel boss portion further includes at least one inward or outward projection annularly and complementarily disposed and formed with respect to the inner periphery of the washer, to receive and mate with the washer, whereby the washer and barrel interlock to prevent rotational movement with respect to each other.

1 Claim, 5 Drawing Sheets

(56) References Cited

U.S. PATENT DOCUMENTS

| | | | | |
|---|---|---|---|---|
| 2,798,222 | A * | 7/1957 | Evans | A42B 3/225 2/9 |
| 3,074,475 | A * | 1/1963 | McPhaden | E06B 9/0623 160/160 |
| 3,182,351 | A * | 5/1965 | Kaufman | E05D 11/1014 16/235 |
| 3,221,792 | A * | 12/1965 | Poupitch | F16B 39/24 411/134 |
| 3,408,771 | A * | 11/1968 | Garrett | E06B 7/28 248/206.5 |
| 3,630,560 | A | 12/1971 | Atkins et al. | |
| 3,885,616 | A * | 5/1975 | Berkowitz | E06B 9/0623 160/215 |
| 4,006,768 | A * | 2/1977 | Horgan, Jr. | E06B 9/063 160/136 |
| 4,289,189 | A * | 9/1981 | Catalano | E06B 9/0661 160/160 |
| 4,378,913 | A * | 4/1983 | Fohl | F16B 21/10 24/453 |
| 4,669,521 | A * | 6/1987 | Barnes | E06B 9/0623 160/136 |
| 4,723,587 | A * | 2/1988 | Scruggs, Jr. | E06B 9/0623 160/136 |
| 5,967,721 | A | 10/1999 | Giachinta et al. | |
| 6,154,881 | A * | 12/2000 | Lee | A61F 9/045 2/9 |
| 6,202,729 | B1 * | 3/2001 | Cunningham | E06B 9/0623 160/136 |
| 6,412,234 | B1 * | 7/2002 | Leoni | E06B 9/063 160/159 |
| 6,589,244 | B1 * | 7/2003 | Sevrain | A61B 17/688 411/338 |
| 6,776,565 | B2 * | 8/2004 | Chang | F16B 39/282 411/136 |
| 7,597,516 | B2 * | 10/2009 | Bucciferro | F16B 5/02 411/162 |
| 7,896,595 | B2 | 3/2011 | Case | |
| 8,070,404 | B1 * | 12/2011 | Schluter | F16B 39/282 411/368 |
| 8,137,040 | B2 * | 3/2012 | Tagusari | F16B 39/12 411/222 |
| 8,745,875 | B1 * | 6/2014 | Hagelthorn | F16C 41/008 29/724 |
| 8,858,141 | B2 | 10/2014 | Williams | |
| 8,863,811 | B2 * | 10/2014 | Yates | E06B 9/0623 160/136 |
| 9,022,709 | B2 * | 5/2015 | Benzing | F16B 39/26 411/150 |
| 9,181,972 | B2 | 11/2015 | Mori et al. | |
| 9,217,273 | B2 * | 12/2015 | Floersch | E06B 5/006 |
| 2005/0098770 | A1 * | 5/2005 | Schell | E01F 13/028 256/25 |
| 2005/0263470 | A1 * | 12/2005 | Horneland | A47B 47/021 211/183 |
| 2007/0128003 | A1 * | 6/2007 | Shiu | F16B 39/282 411/533 |
| 2008/0083510 | A1 * | 4/2008 | Gessford | E06B 9/0623 160/161 |
| 2009/0110510 | A1 * | 4/2009 | Cairo | F16B 39/24 411/197 |
| 2010/0051397 | A1 * | 3/2010 | Kim | F16D 65/12 188/218 XL |
| 2011/0170983 | A1 * | 7/2011 | Day | F16B 39/24 411/370 |
| 2016/0076573 | A1 * | 3/2016 | Stewart | F16B 31/02 411/11 |
| 2016/0160904 | A1 * | 6/2016 | Lee | F16B 39/24 411/332 |
| 2017/0284153 | A1 * | 10/2017 | Reiner | E06B 9/17 |
| 2017/0284154 | A1 * | 10/2017 | Reiner | E06B 9/18 |
| 2017/0342768 | A1 * | 11/2017 | Zwierzykowski | E06B 9/00 |

OTHER PUBLICATIONS

DC Graves "Material Handling Installation Services" 2015 <https://www.dcgraves.com/material-handling-installation-ma-s/1962.htm> (Year: 2015).*

* cited by examiner

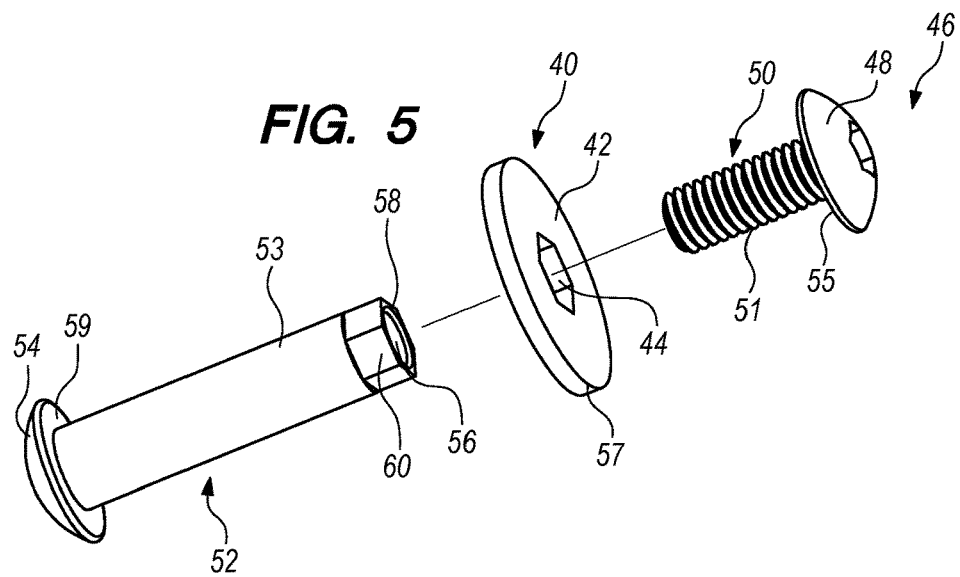
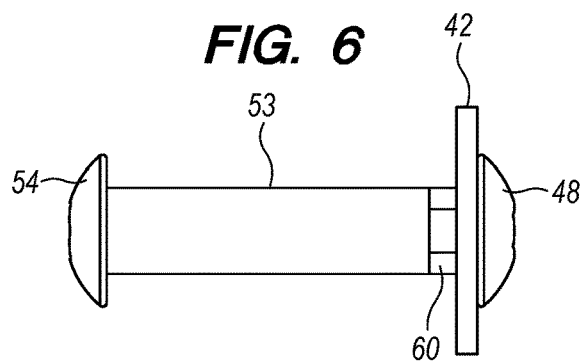
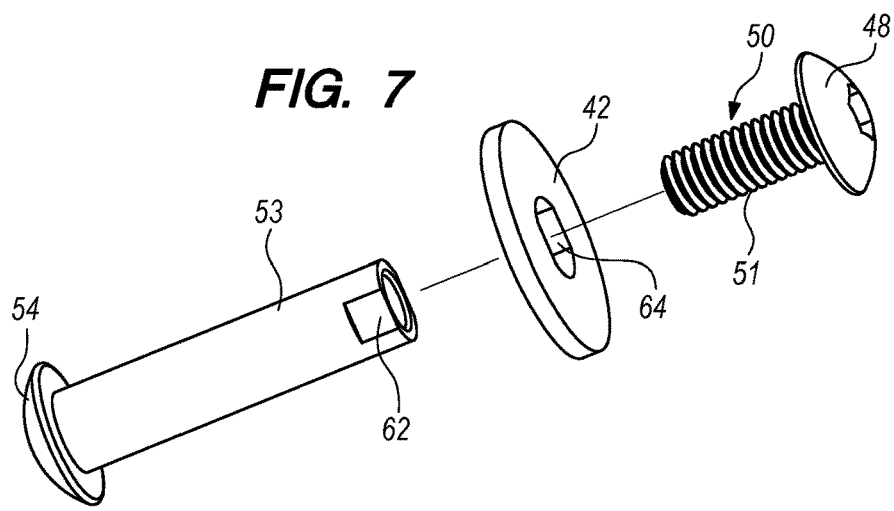

BARREL BOLT FASTENER ASSEMBLY

CROSS-REFERENCE TO RELATED APPLICATIONS

Not Applicable

TECHNICAL FIELD

This invention relates generally to removable fasteners, and more particularly to an improved barrel bolt fastener assembly.

BACKGROUND ART

Bolts and bolt systems are crucial components in modern manufacturing having a vast range of applications in both commercial and industrial products. Although seemingly straight forward in use, those skilled in the art will recognize that bolts rely on a relatively complex combination of mechanical properties and design features that enable them to function properly. More specifically, a bolt's utility is not determined simply by whether it fits into a hole or not, but rather, whether it complies with the applicable specification including physical dimensions, thread density, forming material, and tightening requirements. The complimentary linkage of nuts and bolts can also significantly affect component assemblies and product efficiency. For example, using a bolt that is too long for a given application may interfere with the proper operation of surrounding components. Similarly, mounting a bolt that has insufficient tensile strength for the specified application, or tends to loosen under vibration or relative transverse motion of the secured components, may cause equipment to prematurely wear or fail.

A bolt thread, a main characteristic of any bolt or bolt system, functions as an extension of the basic machine concept of an inclined plane wrapped around a shaft. That is, when the thread is turned, it moves the mating part or nut up the inclined plane. This relative motion between the nut and the bolt functions to reduce the distance between the bearing surfaces of the bolt and nut. This dimension is referred to as the "grip length" of the bolted joint. When more turning force or "torque" is applied to the shaft, the more force is exerted on the nut. This force creates a tension or "preload" force in the bolt, which in turn, clamps the mating parts together. Generating and maintaining sufficient preload force is the key to strong and reliable bolted joints that will not loosen or break under load. Those skilled in the art will recognize that a fastener, when tightened, functions by analogy, much like a spring where rotating the bolt stretches the spring and generates a preload force. The more the bolt is rotated (and the joint members within the grip resist), the more it stretches and generates more preload or tension and simultaneously compresses the components together. "Clamping force" is thus defined as the difference between the preload force and the tension force on the joint. Thus, where no tension loads are applied to a joint, the clamping force equals the preload force. If the tension load is equal to the preload, there is no clamping force. Accordingly, if the tension load is increased beyond the initial preload force, the joint will separate. After a joint separates, it will continue to incur increased tensile loads until the ultimate tensile strength of the fastener is reached and the fastener breaks. Thus, as a practical matter, joint failure typically occurs well before a fastener actually breaks because the parts that are being held together will loosen and not function properly. In view of the foregoing, proper preload, and thus proper clamping force, must therefore be developed and maintained in order to reduce the likelihood of a variety of joint problems such as fatigue, separation, and "self-loosening" from vibration and/or transverse motion of the involved components, any one or combination of which may lead to joint failure.

Joints are also subject to load by shear force, tension force, or a combination of both. Where a joint is loaded in tension, the preload force on the bolt functions to oppose the applicable joint separating forces. Thus, the ultimate strength of a joint is limited by the strength of the bolt creating the joint. Accordingly, the higher the preload force the better the joint as it will prevent the assembled parts from moving and the joint from loosening. Stated more simply, the preload force determines the strength of a joint. It is therefore important that preload force be maintained in a fastener during operation. Shear forces result when friction between the fastened parts inhibits movement. Thus, the friction carries all or part of the load, not the fastener. Here, the greater the preload force, the greater the clamping force, the greater the friction, and the stronger the joint. Absent other forces such as vibration, a properly designed and tightened joint will not experience a direct shear load.

In summary, depending on the design and specific application, a bolt may loosen in service (i.e. lose its tension or preload) for a variety of causes, including any or all of the following: (1) vibration, which can create relative transverse movement of the bolted materials leading to self loosening of the nut; (2) relaxation of the bolted joint after tightening, such as, for example, due to embedment or gasket creep; (3) elastic interactions when multiple bolts are present in a bolted joint; (4) temperature fluctuations of the components; (4) insufficient preload developed at installation; and (5) operation (including improper operation) of the bolted joint components.

Consider, for example, the use of component fasteners in removable accordion gates as have been used in indoor and outdoor retail and warehouse environments to temporarily prevent access to designated service and work areas. Such areas may include, for example, shopping aisles, checkout aisles and the like, as may be defined by shelving and storage racks such as pallet rack systems and assemblies. Accordion gates used in these applications typically comprise a plurality of interconnected and moveable accordion elements or components that cooperate together (i.e. rotate transversely to one another about a corresponding common axis and joint) to permit the respective gates to be unitarily extensible and retractable, as limited by the number and length of the corresponding elements. Accordion gates are typically mounted and substantially permanently affixed in the aforementioned entryways at their trailing gate ends to receiving outwardly facing pallet post sections by threading one or more bolts through corresponding receiving keyholes or apertures stamped in the respective components. When not required for use, the gates are secured to the receiving posts in substantially retracted storage positions, limited by the number and width of extensible accordion elements, using chains, flexible cord, or other suitable retention devices. When it is subsequently desirable to block and inhibit access to a corresponding entryway and/or aisle section, the retention device is removed or disabled, whereupon the gate may be extended and secured at its leading end to a corresponding opposing and receiving outwardly facing pallet post section in the same or similar manner using one or more bolts threaded through receiving keyholes or apertures.

Accordion gates thus function to expand and contract by the relative transverse movement of the joined members or "slats" about a common joint and axis. Typically these joints comprise barrel bolts (and mating screws), but may also utilize a variety of removable fasteners including conventional carriage bolts, hex bolts, flange bolts, and shoulder bolts. As those skilled in the art will recognize, a barrel bolt (also known in the art as a "sex bolt") is a type of mating fastener combining an internally threaded (female) fastener barrel with an externally threaded (male) fastener screw. Barrel bolts are typically used for through bolting applications where a low profile bolt head is desired on both sides of a joint (i.e. both sides of the joined gate slats in a removable accordion gate).

As referenced above, depending on the design and specific application, conventional fasteners, including the above referenced barrel bolts, may lose their tension or preload in service for a variety of causes. In accordion gates and similar applications, a principal cause of such tension loss is the relative transverse motion of the cooperating slats about their common joint and axis. More specifically, the repetitive transverse motion resulting from expanding and contracting the gate (and the cooperating slats) applies opposing forces on each bolt barrel portion and each nut (fastener screw in a barrel bolt) that may result in the loosening (i.e. unscrewing) of the respective joints ultimately leading to joint fatigue or failure, which in turn, may lead to fatigue or failure of the gate itself.

To address the above issues, manufacturers have for some fastener applications, including accordion gates of the type described above, replaced conventional removable fasteners (such as the above referenced barrel bolts) with low profile permanent mechanical fasteners such as rivets. As those skilled in the art will recognize, a rivet is a permanent fastener generally comprising a smooth cylindrical shaft with a "factory head" on one end and a "tail" (also interchangeably referred to as a "shop tail" or "buck tail") on the opposite end thereof. Upon installation, the rivet is placed in an aperture such as a punched or drilled hole and the tail is then permanently deformed about the hole to mechanically hold the fastener in place. Specifically, the tail is "upset" or "bucked", so that it expands to a multiple of its original size (typically 1.5 times the original shaft diameter), while holding the rivet in place. The deforming action functions to create a new head on the other end by smashing the tail material flatter, resulting in a rivet having a low profile dumbbell shape. Because there is effectively a head on each end of the installed rivet, it can support both tension loads (loads parallel to the shaft) as well as shear loads (loads perpendicular to the shaft). Moreover, because the rivet is permanently installed, it generally resists joint loosening from opposing transverse motion such as found in the above referenced accordion gates. Such joints, however, are still not impervious to joint fatigue or failure. When such joints (or the affixed components) do fatigue or fail, the joint must be replaced, as rivets are generally not amenable to repair. In such case, each joint must be drilled through to physically remove the rivet material. This activity is typically performed off-site requiring substantial time, labor, and expense, and resulting in loss of use by the customer of the product itself. In the case of accordion gates described above, such removal and repair may be problematic for the customer as an entryway, aisle, or other designated area, may be left open or require installation of a new or temporary gate during the off-site repair of the damaged gate resulting in additional time and expense for the customer and/or the service technician.

Accordingly, there is a need for an improved fastener, and more specifically, an improved barrel bolt fastener assembly, that overcomes the disadvantages of the prior art by inhibiting or preventing the loss of joint tension and preload (including, but not limited to, such loss or loosening resulting from relative transverse motion of the clamped components). Still further, there is a need for such an improved barrel bolt fastener assembly that functions to inhibit and prevent the aforementioned loss of joint tension and preload as may occur, for example, but not limitation, in the exemplary removable accordion gate application above, thereby inhibiting or preventing fatigue and failure of the component joints as well as the applicable gate.

DISCLOSURE OF INVENTION

It is a principle object of the present invention to provide an improved barrel bolt assembly that inhibits or prevents the loss of joint tension and preload by correspondingly inhibiting or preventing loosening of the joint caused by vibration and/or relative transverse motion of the clamped parts.

It is a further object of the present invention to provide an improved extensible gate which includes or incorporates one or more such improved barrel bolt assemblies as operative joints for corresponding interconnected gate members such as, by example, but not limitation, the above referenced accordion members in an accordion style gate.

In carrying out these and other objects, features and advantages of the present invention, there is provided an improved barrel bolt assembly including a fastener, a barrel, and a washer. The fastener includes a head portion and a shank portion extending therefrom that is preferably, but not necessarily, externally threaded and thus operative as a screw. The barrel similarly includes a head portion and a boss portion extending therefrom that is likewise preferably, but not necessarily, internally threaded, and terminates in a shoulder portion. The boss portion (and where applicable the internally threaded boss portion) is operative to receive the faster shank portion (and again where applicable, the externally threaded fastener screw shank portion). In keeping with the invention, the washer includes at least one inward and/or outward projection annularly disposed about an internal periphery thereof. The barrel boss portion, and preferably, but not necessarily, the barrel shoulder portion, similarly includes at least one inward and/or outward projection annularly and complementarily disposed and formed with respect to the inner periphery of the locking washer. In operation, the aforementioned barrel boss (and/or shoulder) portion projections (whether inward projecting or outward projecting) receive and mate with the respective washer portion projections, whereby the washer and barrel interlock to prevent rotational movement with respect to each other thereby preventing loosening of the joint and corresponding joint fatigue or failure.

In further carrying out this and other object, features and advantages of the present invention, there is further provided an improved extensible gate for use in blocking access to designated indoor and outdoor areas which gate includes or incorporates one or more of the above referenced improved barrel bolt assemblies as a common joint. Such an improved gate includes a plurality of interconnected members that are operative to rotate transversely to one another about a plurality of common axes and corresponding joints to permit the gate to be unitarily extensible and retractable. At least one such common joint comprises a barrel bolt assembly including a washer having at least one inward or outward projection annularly disposed about an internal periphery thereof, a fastener having a head portion and a shank portion extending therefrom that is preferably, but not necessarily, externally threaded and thus operative as a screw, and a barrel having a head portion and a boss portion extending therefrom that is likewise preferably, but not necessarily, internally threaded. The barrel bolt boss portion (and where applicable the corresponding internal threads disposed therein) will function to receive the fastener shank portion (again where applicable the external threads disposed thereon) and the barrel boss portion includes at least one inward or outward projection annularly and complementarily disposed and formed with respect to the inner periphery of the washer, to receive and mate with the washer. The washer and barrel thus interlock to prevent rotational movement with respect to each other thereby preventing loosening of the joint and corresponding joint fatigue or failure as well as gate fatigue or failure.

BRIEF DESCRIPTION OF DRAWINGS

FIG. 5 is an exploded perspective diagram of an alternative preferred, but not required, embodiment of the improved barrel bolt assembly of the present invention as may be used, for example, in an accordion gate such as that shown in FIG. 2;

FIG. 6 is a side elevation view of the embodiment of the improved barrel bolt assembly shown in FIG. 5;

FIG. 7 is an exploded perspective diagram of an additional preferred, but not required, embodiment of the improved barrel bolt assembly of the present invention as may be used, for example, in an accordion gate such as that shown in FIG. 2;

DISCLOSURE OF THE INVENTION

Figure 1:
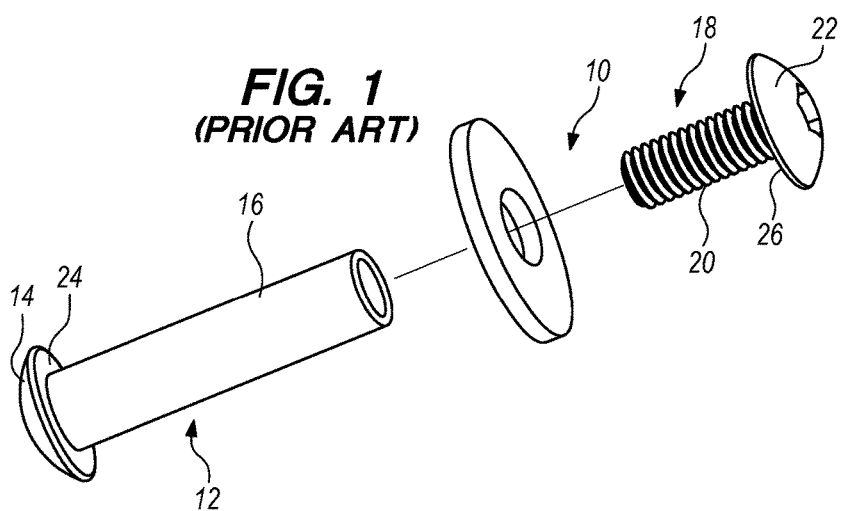
FIG. 1 is an exploded perspective diagram of a prior art barrel bolt assembly.

With reference to FIG. 1 of the drawings, there is provided a prior art barrel bolt assembly 10. As those skilled in the art will recognize, barrel bolts 10 of the type shown and described in FIG. 1, are typically used for through bolting applications where a low profile bolt head is desired on both sides of a joint and/or the respective components being joined. A conventional barrel bolt assembly 10 thus typically comprises an aptly named "barrel" portion 12 having a low profile head or flange 14 (also called a barrel head) and boss 16 extending therefrom that is internally threaded. Boss 16 is operative to receive a fastener screw 18 that is externally threaded 20 and similarly having a low profile head or flange 22. Barrel head 14 and screw head 22, and more particularly their respective inner surfaces 24 and 26, provide corresponding bearing surfaces that operate together to clamp and thus bind or bridge the gap between the respective joined components. In other words, boss 16 (along with fastener screw 18 received therein) sit within the components that are being fastened together with inner surface 24 of barrel head 14 sitting flush on one side of a first component and inner surface 26 of screw head 22 sitting flush on the opposite side of a second component.

Figure 2:
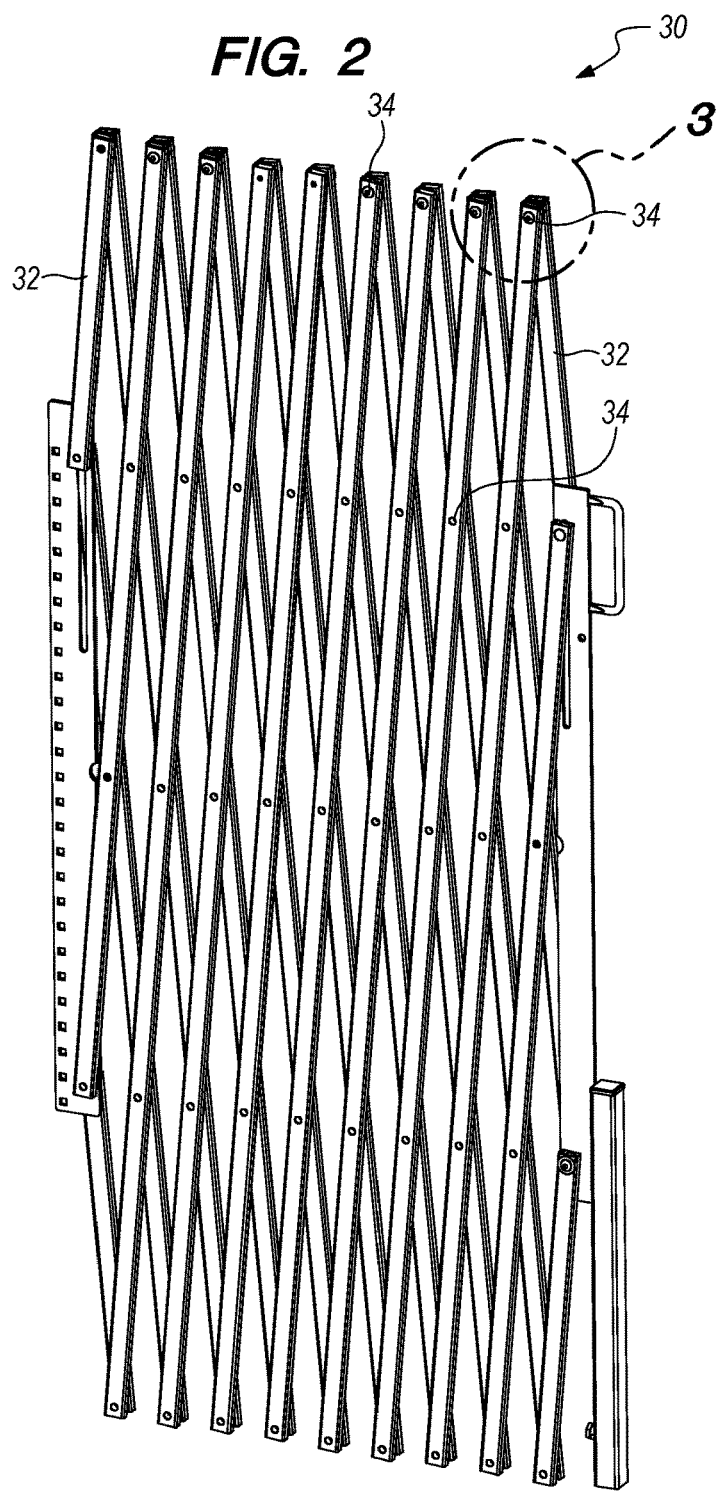
FIG. 2 is a perspective diagram of an improved extensible gate that may used to block access to a designated area such as, for example, a storage and/or shopping aisle defined by a pallet rack system implemented in an indoor our outdoor retail or warehouse environment, and incorporating the improved barrel bolt assembly of the present invention.

In the case of an extensible gate, the above applicable joined components comprise first and second accordion members or slats 32 as shown in FIG. 2, that function to transversely move with respect to one another about the common axis of the corresponding barrel bolt joint. As indicated above, as externally threaded fastener screw 18 is tightened (i.e. torque is applied by turning), the respective components (barrel portion 12 and fastener screw 18) are drawn together. At a certain point, the distal end or "shoulder" of boss 16 contacts an inside surface 26 of screw flange 22 to place an upper limit on the applied clamping force thus preventing damage to the component surfaces being fastened.

Turning to FIG. 2 of the drawings, there is provided a perspective diagram of an improved extensible gate 30 as may be used to inhibit or block access to a designated area such as, for example, a storage and/or shopping aisle defined by a pallet rack system implemented in an indoor or outdoor retail or warehouse environment or the like. Such pallet rack systems are well known to those skilled in the art and are described in substantial detail in co-pending patent application Ser. Nos. 15/083,757 and 15/201,665, filed Mar. 29, 2016 and Jul. 5, 2016, respectively. These applications are both commonly owned by the assignee of the present invention and their disclosures are incorporated herein by reference in their entirety. By way of overview, the aforementioned pallet rack systems typically include a plurality of support posts for receiving corresponding horizontal connecting lengths and vertically spaced horizontal rack beams. Each such support post generally comprises a single piece of metal having an outwardly faced post section or margin, corresponding parallel side post sections or margins, and an opposed terminal end section or margin defining a substantially square or rectangular post cross section. The referenced outwardly facing post sections and parallel post sections are each typically provided with at least a row of vertically spaced stamped apertures such as keyhole slots and often two rows thereof defining horizontally spaced aperture or slot pairs. The slots in each slot pair may be angularly related to one another to allow a better fit for components being attached to the rack assembly, including the above referenced rack beams as well as accordion gates of the type shown and described in FIG. 2 herein. The support posts referenced above are secured together in any suitable relation by the horizontal connecting lengths often including a series of corresponding truss legs or the like.

Characteristically, the connecting lengths of such support posts are affixed to opposing terminal post end sections and/or parallel side post sections by threading and securing one or more fasteners such as bolts (including but not limited to hex bolts, carriage bolts, flange bolts, and the like) through the corresponding apertures. A plurality of vertically spaced horizontal rack beams are affixed to opposing parallel side post sections by similarly threading and securing one or more fasteners through the corresponding post section apertures. Each horizontal rack beam is typically comprised of sheet metal having a ledge or lip for receiving and supporting a wooden plank or other suitable shelving material such as sheet metal decking or the like, which in turn receives and supports product for storage and display. The placement of opposing pallet rack assemblies of the type herein described in such indoor and outdoor retail and warehouse environments defines corresponding and generally parallel aisles in relation thereto.

Figure 3:
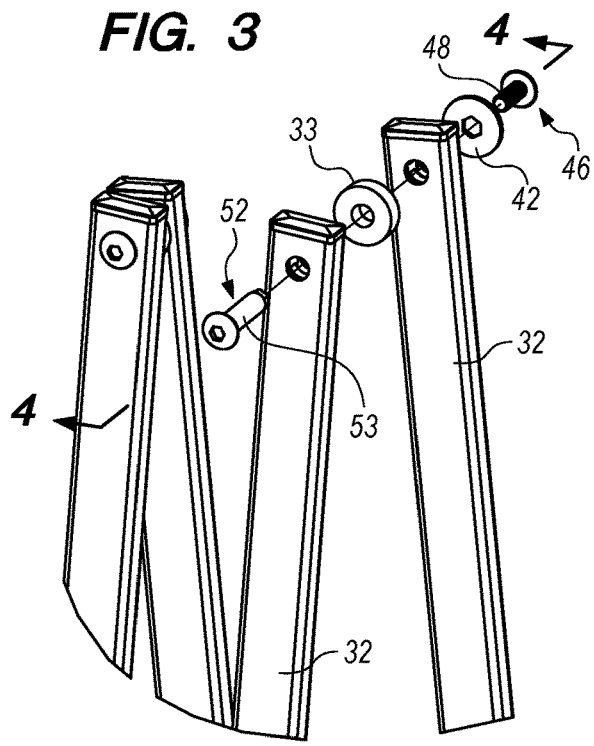
FIG. 3 is an exploded perspective diagram of the exemplary extensible gate of FIG. 2 showing the detail of the area designated by reference numeral 3 and illustrating a preferred, but not required, embodiment of the improved barrel bolt assembly of the present invention that may be used therein.
Figure 4:
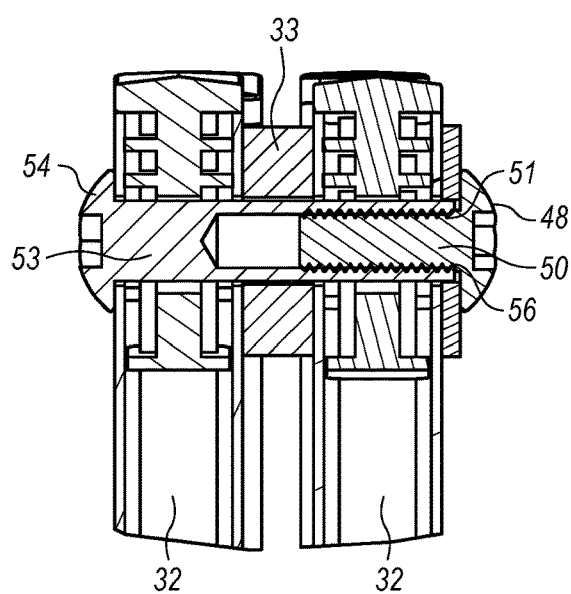
FIG. 4 is a sectional view of the improved barrel bolt assembly of FIG. 3 taken along line 4-4.

Turning now to FIG. 3 of the drawings, there is shown an exploded perspective diagram of the detail of the area designated by reference numeral 3 in FIG. 2 and illustrating one preferred, but not required, embodiment of the improved barrel bolt assembly 40 of the present invention for use in an exemplary improved extensible gate 30. A cross section taken along line 4-4 in FIG. 3 of assembled barrel bolt assembly 40 is shown in FIG. 4. Still further, an exploded perspective diagram of the component parts of barrel bolt assembly 40 is shown in FIG. 5 with a corresponding side elevation shown in FIG. 6. As shown extensible gate 30 comprises a plurality of accordion members or "slats" 32 that are interconnected and transversely movable with respect to one another about common axis i.e. corresponding pivot points 34 which generally comprise a fastener such as a rivet or barrel bolt as described above. Accordion members 32 cooperate together to permit gate 40 to be unitarily extensible and retractable, such as for example, to span an entryway or aisle defined by a pallet rack assembly, as limited only by the number and length of accordion members 32.

In keeping with the invention, barrel bolt assembly 40 comprises a primary washer 33 disposed between respective accordion members 32. Assembly 40 further comprises a washer 42 having at least one inward or outward projection 44 or any combination thereof (shown in FIGS. 3-6 as exemplary inward projections) annularly disposed about an internal periphery of washer 42 thereof. Assembly 40 further comprises a fastener 46 having a head portion 48 and a shank portion 50 extending therefrom that is preferably, but not necessarily, externally threaded to function as a screw. External threads of shank portion 50 are shown and designated generally by reference numeral 51. Barrel bolt assembly 40 further comprises a barrel 52 having a head portion 54 and a boss portion 53 extending therefrom that terminates in a shoulder portion 58. Again, barrel bolt boss portion is preferably, but not necessarily, internally threaded, depending on the application. Internal threads of barrel bolt boss portion 53 are shown and designated generally by reference numeral 56. Barrel bolt boss portion 53 is operative to receive fastener shank portion 50. In a preferred, but not required, embodiment, internal threads 56 are operative to receive the externally threaded fastener shank portion 50 and more specifically external threads 51.

In further keeping with the invention, barrel shoulder portion 58 further comprises at least one inward or outward projection 60 or any combination thereof (shown in FIGS. 3-6 as exemplary inward projections) annularly and complimentarily disposed and formed with respect to the inner periphery and projections 44 of washer 42 to receive and mate with the washer 42 and corresponding projections 44 thereof whereby the washer 42 and the barrel 52 (specifically barrel shoulder portion 58) interlock and thereby prevent rotational movement there between. In a further preferred, but not required embodiment, fastener head portion 48 further comprises a clamping surface 55 having a plurality of inward or outward projections disposed thereon (not shown). These projections are operative to engage a surface 57 of the washer and prevent rotational movement there between. Still further, in a preferred, but not required, embodiment, barrel head portion 54 similarly comprises a clamping surface 59 including a plurality of inward or outward projections disposed thereon (not shown). These projections are likewise operative to engage a surface of a clamped component (i.e. slat 32 in the exemplary accordion gate 30) and prevent rotational movement there between. When the aforementioned improved barrel bolt assembly is used in an accordion gate of the type shown and described in FIG. 3 by reference numeral 30, the relative transverse motion of slats 32 is ineffective to loosen barrel bolt 40 thus preventing joint fatigue and failure as well as gate fatigue and failure.

Figure 8:
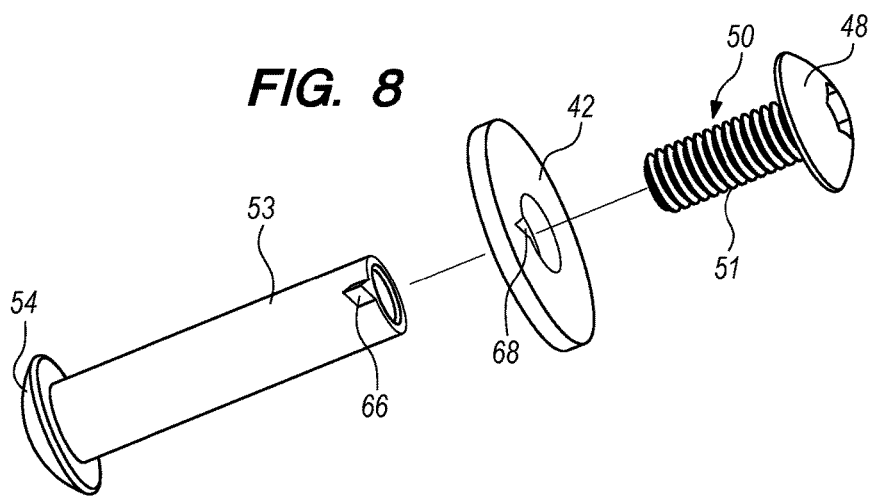
FIG. 8 is an exploded perspective diagram of an additional preferred, but not required, embodiment of the improved barrel bolt assembly of the present invention as may be used, for example, in an accordion gate such as that shown in FIG. 2.

As referenced above, the inward and/or annular projections 44 of washer 42 are disposed to be complimentary to corresponding inward and/or annular projections 60 of shoulder portion 58 of barrel bolt boss portion 53 to interlock the respective components and prevent rotational movement there between. Accordingly, any suitable combination of such mated and corresponding inner and outward projections may be utilized in keeping with the spirit and scope of the present invention. FIGS. 5-6 thus illustrate multiple (6) inward projections 60 disposed on barrel bolt shoulder portion 60 and mated with 6 corresponding inward projections 44 disposed on the inner periphery of washer 42. In an alternative embodiment shown in FIG. 7, two (2) inward projections 62 are disposed on barrel bolt should portion 58 and mated with two (2) corresponding inward projections 64 disposed on the inner periphery of washer 42. Still further, in yet an additional preferred, but not required embodiment shown in FIG. 8, a single (1) outward projection 66 is disposed on barrel bolt shoulder portion 58 to be mated with a single (1) outward projection 68 disposed on the inner periphery of washer 42.

While embodiments of the invention have been illustrated and described, it is not intended that these embodiments illustrate and describe all possible forms of the invention. Rather, the words used in the specification are words of description rather than limitation, and it is understood that various changes may be made and equivalent structures, features, and functions may be provided without departing from the spirit and scope of the invention.

What is claimed is:
1. An extensible gate assembly, comprising:
   a shelving assembly disposed on a retail or warehouse floor, the shelving assembly having first and second posts defining an aisle there between;
   a plurality of interconnected gate member pairs, each member pair comprising a first member and a second member separated by a corresponding primary washer wherein the first and second members are each operative to rotate transversely to one another about a corresponding common axis and corresponding common joint including the primary washer through a corresponding angle of rotation selected from a plurality of angles of rotation, during expansion of the gate between the first and second posts to block access to the aisle, and during retraction of the gate between the first and second posts to permit access to the aisle;
   wherein at least one said corresponding common joint comprises a barrel bolt assembly, the barrel bolt assembly further comprising:
   a secondary washer having at least one inward or outward projection annularly disposed about an internal periphery thereof;

a fastener having a head portion and a shank portion extending from the fastener head portion;

a barrel having a head portion and a boss portion extending from the barrel head portion, the boss portion operative to receive the fastener shank portion; and wherein the barrel boss portion further comprises at least one inward or outward projection annularly and complementarily disposed and formed with respect to the inner periphery of the secondary washer, to receive and mate with the secondary washer, whereby the secondary washer and barrel interlock to prevent rotational movement with respect to each other to inhibit loss of joint tension or preload from relative rotational movement of the member pair about its corresponding angle of rotation during expansion and retraction of the gate, thus inhibiting fatigue and failure of the common joint and gate.

* * * * *